Figure 1:
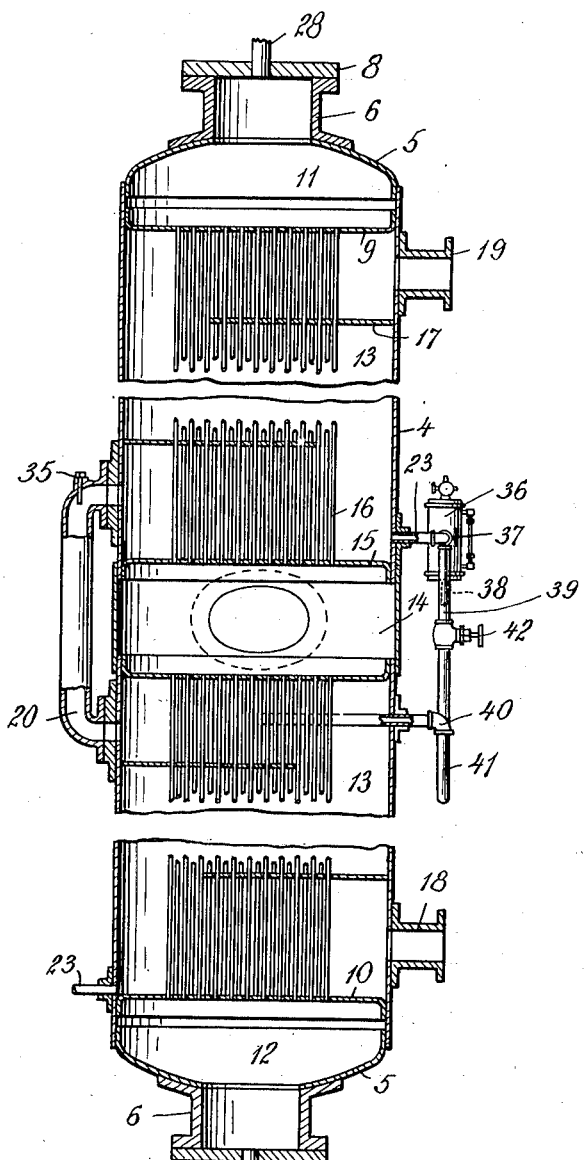

Dec. 31, 1929.  J. E. BELL  1,741,276
OPERATION OF PRESSURE STILLS
Filed March 24, 1924   2 Sheets-Sheet 1

John E. Bell INVENTOR

BY Pennie Davis Marvin Edmonds

ATTORNEYS

Dec. 31, 1929.    J. E. BELL    1,741,276
OPERATION OF PRESSURE STILLS
Filed March 24, 1924    2 Sheets-Sheet 2

John E. Bell. INVENTOR
BY
ATTORNEYS

Patented Dec. 31, 1929

1,741,276

UNITED STATES PATENT OFFICE

JOHN E. BELL, OF BROOKLYN, NEW YORK, ASSIGNOR TO SINCLAIR REFINING COMPANY, OF CHICAGO, ILLINOIS, A CORPORATION OF MAINE

OPERATION OF PRESSURE STILLS

Application filed March 24, 1924. Serial No. 701,397.

This invention relates to an improved method of operating pressure stills and involves an improved method of fractionally condensing the vapors from pressure stills whereby accurate fractionation is obtained directly.

The invention relates particularly to improvements in the operation of fractionating towers employed in conjunction with pressure stills having reflux towers thereon, for cracking hydrocarbon oils of higher boiling point such as gas oils and the like to form more volatile or lighter hydrocarbon oils such as those which constitute commercial gasoline or pressure distillate.

In cracking hydrocarbon oils by distillation under pressure, the crude pressure distillate discharged from the top of the reflux tower through which the vapors are passed from the pressure still may contain, in addition to the lighter hydrocarbons suitable as components of gasoline, hydrocarbons of the kerosene group and others even heavier. It has heretofore been customary to subject all of the vapors from the reflux tower on the pressure still to condensation in a common receptacle and to fractionate the condensate so obtained to merchantable products and to separate out the heavier hydrocarbons by redistillation.

One of the objects of the present invention is to partially or entirely dispense with this redistillation by fractionally condensing the vapors as they come from the reflux tower on the pressure still, separating the heavier components from the lighter components and separately condensing them.

According to this invention, the vapors from the reflux tower on the pressure still are passed successively through a series of separate vapor condensing chambers maintained at progressively lower temperatures and a regulated part of the condensate from condensing chambers at lower temperature is refluxed into condensing chambers of higher temperature. The condensing surfaces in the successive chambers are maintained at progressively lower temperatures so that the heaviest vapors are condensed in the first chamber entered by the vapors, the next heaviest vapors in the next chambers entered and so on. By refluxing a part of the condensate from condensing chambers at lower temperature into condensing chambers at higher temperature, the refluxed condensate assists in effecting condensation and is subjected to refractionation; and, by regulation of the amount of condensate so refluxed, the fractional condensation in the condensing chambers into which the refluxed condensate is introduced is controlled.

According to this invention, the accuracy of the fractionation is further promoted by maintaining a low temperature differential between the condensing surfaces and the vapors undergoing condensation thereon. As the temperature of the condensing surface approaches the critical temperature of the vapor to be condensed the more accurate is the fractionation, and it is desirable, for close fractionation, that the condensing surfaces be maintained at temperatures just below the critical temperatures of the respective vapors to be condensed. Practically, however, it is necessary to sacrifice, to a certain extent, accuracy or definiteness in cut because of the large number of compounds of different gravity in the vapors to be condensed and the increased extent of condensing surface necessary where a lower temperature differential is maintained.

In carrying out the improved process of the present invention, it is advantageous to maintain a differential of less than about 25° F. between the temperature of the cooling fluid circulating over the condensing surfaces and the temperature of the vapors undergoing condensation thereon, the temperature of the condensing surface being somewhere intermediate the temperatures of the cooling medium and the vapors respectively. The temperature differential of 25° F. between the cooling medium entering each condensing chamber and the vapors leaving the same chamber is substantially maintained throughout the condensing chambers of the series. The temperature differential may be lower, say 10° F. for example, with corresponding increase in the size of the apparatus if the same number and character of cuts are to be made. For example, to condense all of the vapors from the reflux tower on the pressure still in the fractional condenser, including the gasoline fraction, with a temperature differential of 25° F., assuming the vapors from the reflux tower on the pressure still have a temperature of about 530° F. when they reach the fractional condenser, the cooling medium for cooling and condensing the vapors would enter at a temperature of about 65° F. and leave at a temperature of about 505° F. By increasing the flow of the cooling medium, or by decreasing its initial temperature, greater condensation can be achieved, but at the expense of the accuracy of the cuts obtained.

According to the present invention, a regulated part of the condensate from condensing chambers at lower temperature is refluxed into the condensing chambers of next higher temperature to increase the efficiency of separation and to control the fractional condensation. The condensate refluxed from a cooler chamber to a hotter chamber is mainly revaporized in a hotter chamber, only a small fraction of heavy components which have been carried over with the lighter vapors remaining behind in liquid form in the hotter chamber. The refluxed condensate is thus subjected to refractionation; and condensation, within the chamber into which the refluxed condensate is introduced in regulated amount, is controlled by the cooling effect of the introduced liquid condensate and the vaporization thereof. All or a part of the condensate from certain of the chambers may be reintroduced into the preceding chamber at higher temperature, and, in some cases, it may be desirable to by-pass a part of the refluxed condensate about the next preceding chamber and introduce it into the succeeding chamber at still higher temperature.

The series of separate condensing chambers in which the vapors are fractionally condensed may be arranged in vertically superposed position in the form of a tower, the vapors undergoing fractional condensation entering at the bottom of the tower and leaving from the top thereof. The condensing surfaces preferably constitute tubes disposed within the condensing chambers and through which the cooling fluid flows. Any cooling fluid, stable at the temperatures to which it is subjected, may be employed, but I find it advantageous to use a suitable oil, and to constantly recirculate it through the tower counter current to the flow of vapors therethrough, through a cooler to absorb the heat from the oil, and back to the tower by means of a suitable pump. That regulated part of the condensate refluxed from each of the superposed chambers to the chamber at next higher temperature may be returned by gravity to the next lower condensing section in the tower.

The invention will be further described in connection with a pressure still of the general type described and illustrated in Patent No. 1,285,200 granted to the Sinclair Refining Company, November 19, 1918, on the application of Edward W. Isom but it will be understood that the invention is of general application to the fractionation of the vapors discharged from reflux towers on pressure stills.

In the accompanying drawings, I have shown certain forms of apparatus in which the process of the invention can be practised and the invention will be further described in connection therewith. It is to be understood, however, that these specific illustrations and description are for the purpose of exemplification and that the scope of the invention is defined in the following claims, in which I have endeavored to distinguish it from the prior art, without, however, relinquishing or abandoning any portion or feature thereof.

Figure 2:
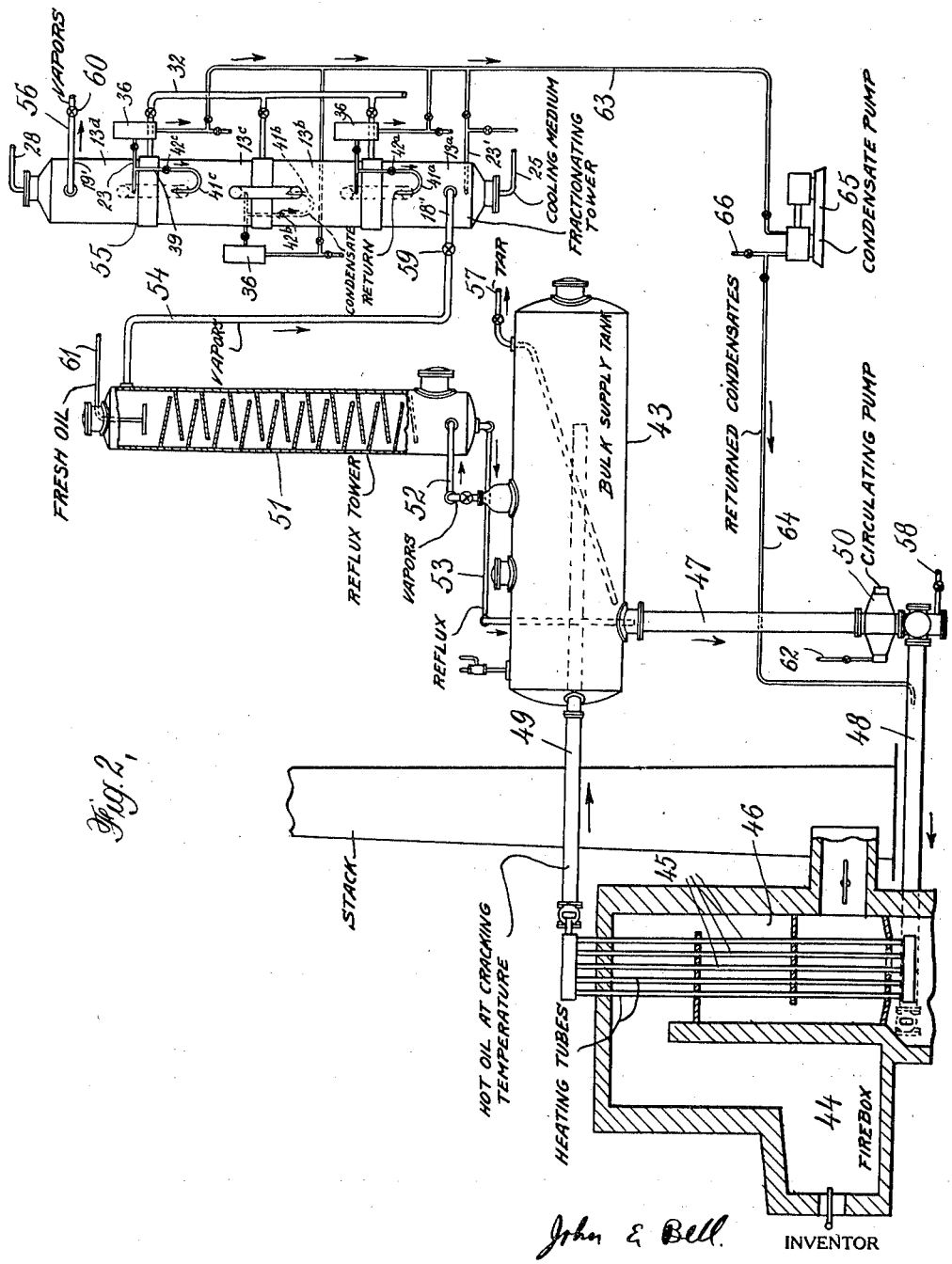

In the accompanying drawings,

Fig. 1 is a fragmentary, axial, longitudinal, sectional view of a fractionating tower adaped for the practice of the process of the invention, and Fig. 2 represents in elevation and partly in section a fractionating tower of the type shown in Fig. 1 in conjunction with a pressure still having a reflux tower thereon.

Each part is identified by the same reference character wherever it occurs in the separate figures.

Referring to the drawings, the fractionating condensing tower comprises a cylindrical shell 4 closed by end plates 5, each of which is provided with a hand-hole fitting 6. The hand-holes are normally closed by plates 7 and 8. Slightly spaced from the end plate 5 at each end of the tower are header sheets, 9 and 10, said sheets forming with the adjacent end plates inlet and outlet chambers, 11 and 12, for the cooling fluid as will presently appear. The space between the header sheets is divided into a plurality of vapor condensing chambers 13, shown as four in number although the number may be varied and is dependent upon the number of cuts desired. Between adjacent vapor condensing chambers are chambers 14 for the cooling fluid formed by header sheets 15 on opposite sides thereof and the wall of the cylindrical tower. The header sheets are successively connected by batteries of tubes 16 extending through the respective vapor condensing chambers whereby the cooling fluid may flow the length of the tower through the cooling fluid chambers and these tubes. The vapor chambers are provided with suitable baffle plates 17, fitting loosely about the cooling tubes 16, to provide a circuitous circulation for the vapors therethrough in order that they may be more thoroughly brought in contact or heat exchanging relation with the cooling tubes.

The lowermost of the vapor condensing chambers is provided with an inlet port 18 for the entrance of the vapors and the uppermost condensing chamber with a vapor outlet 19. Tubular connections 20 are provided to conduct the vapors or such portion thereof as remains uncondensed from each vapor chamber, except the topmost, to the vapor condensing chamber next above. The point at which this connection communicates with the upper vapor condensing chamber to which it is connected is sufficiently above the header sheets forming the bottom of that chamber to allow for the collection of liquid condensate therein.

Where oil is employed as the cooling fluid, it is preferably circulated downwardly through the tower and drawn off through the bottom, cooled, and returned to the top of the tower. For this purpose, the cooling oil may be circulated through an external cooler of the usual tubular construction by means of a circulating pump. The oil may be cooled in this external cooler by water or other appropriate cooling fluid. In order to supplement the control of the gravities of the several cuts effected in the respective vapor condensing chambers by regulated refluxing of the condensate separately collected in each chamber, more or less of the cooling fluid may be by-passed around any of the condensing chambers except the first or it may be carried from any of the cooling fluid chambers directly to the cooler through pipe 32 and the valved connections thereto communicating with the cooling fluid compartments in the tower. Thermometer wells 35 are provided in the connections 20 for observation of the temperature in each of the vapor connections.

Each condensing chamber near its bottom and below the level of the vapor connection thereto, has a draw-off pipe 23, which is provided at 36 with a gauge glass to indicate the level of the condensate in the chamber, and a valve 37 for shutting off the draw-off and controlling the passage of condensate therethrough. A pipe 38 connected to the gauge glass receptacle extends to a cooler or storage tank. A branch connection 39 leads from the draw-off 23 of each condensing chamber, except the lowermost, to the top of the next lower condensing chamber at 40, a trap being formed in said pipe at 41 and a valve located therein at 42. A regulated part of the condensate from each condensing chamber is refluxed through this connection to the next lower and hotter condensing chamber where it is revaporized and returned for further treatment, the amount of reflux so introduced into the next lower and hotter chamber being controlled by valve 42. The stream of condensate entering the top of condensing chamber from pipe 39 spreads over the topmost baffle therein, and, the holes in the baffle through which the cooling tubes extend being somewhat larger than the latter, forms films on the tubes until vaporized, being thus effectively subjected to the temperature of the tubes. The refluxed condensate is thus in effect redistilled and refractionated securing a more definite cut while at the same time effecting a regulated condensation of the vapors of the chamber into which it is introduced.

The pressure still illustrated in Fig. 2 is made up of the bulk supply tank 43 located away from the heating furnace 44, the vertical heating tubes 45 arranged in the heating flow 46 of the furnace, and circulating pipes 47, 48 and 49 connecting the lower and upper ends of the vertical tubes, respectively, with the bulk supply tank and a circulating pump 50 for circulating the oil from the bulk supply tank through the vertical tubes and back to the bulk supply tank. Arranged above the bulk supply tank is the reflux tower 51 having a series of baffles therein and connected with the vapor dome of the bulk supply tank through the vapor line 52. An overflow reflux line 53 leads back to the bulk supply tank. The vapors from the top of the reflux tower escape through the vapor line 54 to the fractionating tower 55 where the vapors from the reflux tower undergo fractional condensation. The vapors pass upwardly through the fractionating tower 55, undergoing fractional condensation during passage, and any uncondensed vapors and gases escape from the top of the tower through connection 56. The vapors escaping through connection 56 may be conducted through a separate condenser, or where they contain no valuable condensible material, may be conducted to a gas holder, or may be otherwise disposed of. A feed line 61 is provided for feeding fresh oil to the top of the reflux tower 51. An additional feed line 62 is provided for feeding oil to the bearings of the pump 50. A continuous tar draw-off is shown at 57 and a pumping-out line for discharging the still is shown at 58.

The pressure may be regulated and reduced by means of a regulating valve 59 between the reflux tower and the fractionating tower or by the valve 60 located beyond the fractionating tower. The fractional condensation of the vapors from the reflux tower passing through the fractionating tower 55 may be effected under the pressure prevailing in the still system, or the fractional condensation of the vapors from the reflux tower may be effected at atmospheric pressure or other suitable intermediate or reduced pressure.

The fractionating tower 55 is of the construction shown in somewhat more detail in Fig. 1, and is provided with four vapor condensing chambers. The cooling fluid, at appropriate temperature, is introduced into the upper cooling fluid compartment tower through connection 28, passed downwardly through the cooling tube and intermediate cooling compartments in the tower, and removed through connection 25. The hot vapors escaping from the reflux tower 51 through connection 54 enter the hottest and lowermost vapor condensing chamber through connection 18' and pass upwardly through the successive vapor condensing chambers, maintained at progressively lower temperature, undergoing partial condensation in each condensing chamber. The uncondensed vapors and gases from the uppermost and coolest vapor condensing chamber in the tower escape through connections 19' and 56. The heaviest vapors are condensed in the lowermost and hottest chamber 13$^a$, the next heaviest vapors in the next chamber 13$^b$ and the progressively lighter fractions in the successive chambers 13$^c$ and 13$^d$, the condensate in each chamber being separately collected in the lower part of that chamber. The liquid condensate collecting in the lowermost chamber 13$^a$, is withdrawn through connection 23'. A regulated part of the condensate collecting in each of the chambers, 13$^b$, 13$^c$ and 13$^d$, may be refluxed into the next lower and next hotter chamber through the connections 41$^a$ 41$^b$ and 41$^c$ respectively, the amount of condensate so returned being controlled in each case by valves 42$^a$, 42$^b$ and 42$^c$ respectively. That part of the condensate collecting in each of these upper chambers which is not refluxed into the preceding chamber is withdrawn through the receptacles 36.

In carrying out the process of the invention, in conjunction with the pressure distillation of relatively heavy hydrocarbon oils for the production of gasoline, the heavier vapors are condensed in the reflux tower 51 by heat exchange with the fresh feed introduced through connection 61 and returned to the still through connection 53. The vapors escaping from the reflux tower through connection 54 comprise the gasoline component, kerosene character fractions, and some heavier vapors. The gasoline fraction, together with the heavier fractions, may be condensed in the fractionating tower 55, or the fractionating tower 55 may be so operated as to separate the heavier components from the gasoline fraction and the gasoline fraction may be conducted to a separate condenser through connection 56. Where the gasoline fraction is condensed in the fractionating tower, the gasoline may be condensed in the upper two chambers and the kerosene and heavier fractions condensed in the two lower chambers. Where the gasoline fraction is separately condensed, the heavier fractions may be separated into various cuts in the chambers of the fractionating tower, for example, kerosene character fractions may be collected in the upper three chambers and a heavier fraction in the lower chamber. The fractions condensed in the chambers of the tower may be marketed as such, or after further refining treatment, or the different fractions may be blended with each other or with other stock in a variety of ways according to the specific composition desired. If no kerosene is desired, the tower may be operated with a smaller drop in temperature of the cooling medium in the tower.

The heavier fraction condensed in the lowermost and hottest chamber 13$^a$ may be returned to the still directly through connections 23' and 63. Such of the other fractions as may be desired may likewise be returned to the still through the valved connections communicating between the connection 63 and the receptacles 36. Where the fractionating tower is operated at a lower pressure than that prevailing in the still system, the fractions returned to the still through connection 63 are forced into the still circulating connection 48 through pipe 64 by means of pump 65. Excess oil over that amount required for introduction into the still may be conducted to suitable storage receptacles through connection 66.

It would be apparent that, in one aspect, this invention provides an operation, which, substituted for the customary final condensation of the vapors discharged from the reflux tower on a pressure still, effects a separation of the vapors into the desired fractions directly as they come from the pressure still, without redistillation. It will further be seen that this invention provides an improved method of fractionating and condensing vapors from a pressure still whereby they are divided into definite cuts or fractions which are under the operator's control. One of the important advantages of the invention is the elimination of the redistillation of crude pressure distillate.

I claim:

1. The improvement in the operation of pressure stills which comprises heating the oil under pressure at a cracking temperature, passing the vapors generated thereby through a path of restricted cross-section to a separate refluxing zone, controlling the refluxing operation in said separate refluxing zone by passing fresh feed oil for the still in direct contact with and countercurrent to the flow of vapors therein, passing the remaining vapors through a series of condensing chambers maintained at progressively lower temperatures, cooling the vapors in said condensing chambers by passing a cooling fluid having a temperature only slightly lower than that of the vapors being cooled in indirect heat exchanging relation with and countercurrent to the vapors in said condensing chambers, controlling the condensation in the said condensing chambers of higher temperature by returning in part the reflux condensate from condensing chambers of lower temperatures, and returning reflux condensate admixed with fresh oil from the first named refluxing operation to the pressure still.

2. The improvement in the operation of pressure stills which comprises heating the oil under pressure at a cracking temperature, passing the vapors generated thereby through a path of restricted cross-section to a separate refluxing zone, controlling the refluxing operation in said separate refluxing zone by passing fresh feed oil for the still in direct contact with and countercurrent to the flow of vapors therein, passing the remaining vapors through a series of condensing chambers maintained at progressively lower temperatures, cooling the vapors in said condensing chambers by passing a cooling fluid having a temperature only slightly lower than that of the vapors being cooled in indirect heat exchanging relation with the vapors in said condensing chambers, controlling the condensation in the said condensing chambers of higher temperature by returning in part the reflux condensate from condensing chambers of lower temperatures, and returning reflux condensate from at least one of said condensing chambers directly to a point in the still where it will pass immediately through the heating zone.

3. The improvement in the operation of pressure stills which comprises heating the oil under pressure at a cracking temperature, passing the vapors generated thereby through a path of restricted cross-section to a separate refluxing zone, controlling the reflux operation in said separate refluxing zone by passing fresh feed oil for the still in direct contact with and countercurrent to the flow of vapors therein, passing the remaining vapors through a series of condensing chambers maintained at progressively lower temperatures, cooling the vapors in said condensing chambers by passing a cooling fluid having a temperature only slightly lower than that of the vapors being cooled in indirect heat exchanging relations with the vapors in said condensing chambers, controlling the condensation in the said condensing chambers of higher temperature by returning in part the reflux condensate from condensing chambers of lower temperatures, and returning reflux condensate admixed with fresh oil from the first named refluxing operation to the pressure still.

4. The improvement in the operation of pressure stills which comprises heating the oil under pressure at a cracking temperature, passing the vapors generated thereby through a path of restricted cross-section to a separate refluxing zone and controlling the refluxing operation in said separate refluxing zone by passing fresh feed oil for the still in direct contact with and countercurrent to the flow of vapors therein, reducing the pressure on the remaining vapors and passing the vapors under reduced pressure through a condensing chamber, cooling the vapors in said condensing chamber by passing a cooling fluid having a temperature only slightly lower than that of the vapors being cooled in indirect heat exchanging relation with the vapors in said condensing chamber, passing the vapors still uncondensed through a separate condensing chamber at a lower temperature, separately collecting the condensate in each condensing chamber and controlling the condensation in the first chamber by returning in part the reflux condensate from the second chamber to the first chamber, and returning reflux condensate admixed with fresh oil from the first named refluxing operation to the pressure still.

5. The improvement in the operation of pressure stills which comprises heating the oil under pressure at a cracking temperature, passing the vapors generated thereby through a path of restricted cross-section to a separate refluxing zone, controlling the refluxing operation in said separate refluxing zone by passing fresh feed oil for the still in direct contact with and countercurrent to the flow of vapors therein, passing the remaining vapors through a series of condensing chambers maintained at progressively lower temperatures, cooling the vapors in said condensing chambers by passing a cooling fluid having a temperature only slightly lower than that of the vapors being cooled in indirect heat exchanging relation with the vapors in said condensing chambers, separately collecting the condensate in said condensing chambers, controlling the condensation in the said condensing chambers of higher temperature by returning in part the reflux condensate from said condensing chambers of lower temperatures, and returning at least one of the heavier condensates to the pressure still.

6. The improvement in the operation of pressure stills which comprises heating the oil under pressure at a cracking temperature, passing the vapors generated thereby through a path of restricted cross-section to a separate refluxing zone, controlling the refluxing operation in said separate refluxing zone by passing fresh feed oil for the still in direct contact with and countercurrent to the flow of vapors therein, passing the remaining vapors through a series of condensing chambers maintained at progressively lower temperatures, cooling the vapors in said condensing chambers by passing a cooling fluid having a temperature only slightly lower than that of the vapors being cooled in indirect heat exchanging relation with the vapors in said condensing chambers and returning reflux condensate from the condensing chamber of highest temperature to the pressure still.

7. The improvement in the operation of pressure stills for cracking hydrocarbon oils to produce gasoline, which comprises heating the oil under pressure at a cracking temperature, passing the vapors generated thereby through a path of restricted cross-section to a separate refluxing zone, controlling the refluxing operation in said separate refluxing zone by passing fresh feed oil for the still in direct contact with and countercurrent to the flow of vapors therein, passing the remaining vapors through a separate condensing chamber, cooling the vapors in said condensing chamber by passing a cooling fluid having a temperature only slightly lower than that of the vapors being cooled in indirect heat exchanging relation with the vapors therein, passing the vapors still uncondensed through a separate condensing chamber of lower temperature, separately collecting the reflux condensate in each of said condensing chambers, controlling the condensation in the condensing chamber of higher temperature by returning in part the reflux condensate from the said condensing chamber of lower temperature, separately condensing the gasoline fraction and separately withdrawing at least one fraction heavier than gasoline from said condensing chambers.

8. The improvement in the operation of pressure stills which comprises heating the oil under pressure at a cracking temperature, passing the vapors generated thereby through a path of restricted cross-section to a separate refluxing zone, controlling the refluxing operation in said separate refluxing zone by passing fresh feed oil for the still in direct contact with and countercurrent to the flow of vapors therein, passing the remaining vapors through a series of condensing chambers maintained at progressively lower temperatures, cooling the vapors in said condensing chambers by passing a cooling fluid having a temperature only slightly lower than that of the vapors being cooled in indirect heat exchanging relation with the vapors in said condensing chambers, and returning reflux condensate admixed with fresh oil from the first named refluxing operation to the pressure still.

9. The improvement in the operation of pressure stills which comprises heating the oil under pressure at a cracking temperature, passing the vapors generated thereby through a path of restricted cross-section to a separate refluxing zone, controlling the refluxing operation in said separate refluxing zone by passing fresh feed oil for the still in direct contact with and countercurrent to the flow of vapors therein, passing the remaining vapors through a condensing chamber, cooling the vapors in said condensing chamber by passing a cooling fluid having a temperature only slightly lower than that of the vapors being cooled in indirect heat exchanging relation with the vapors in said condensing chamber, passing the vapors still uncondensed to a separate condensing chamber at a lower temperature, separately collecting the condensate in each condensing chamber and controlling the condensation in the first chamber by returning in part the reflux condensate from the second chamber to the first chamber, and returning reflux condensate admixed with fresh oil from the first-named refluxing operation to the pressure still.

10. The improvement in the operation of pressure stills which comprises heating the oil under pressure at a cracking temperature, passing the vapors generated thereby through a path of restricted cross-section to a separate refluxing zone, controlling the refluxing operation in said separate refluxing zone by introducing fresh oil directly into direct and intimate contact with the vapors therein, passing the remaining vapors through a series of condensing chambers maintained at progressively lower temperatures, cooling the vapors in said condensing chambers by passing a cooling fluid having a temperature only slightly lower than that of the vapors being cooled in indirect heat exchanging relation with the vapors in said condensing chambers, controlling the condensation in said condensing chambers of higher temperature by returning in part the reflux condensate from condensing chambers of lower temperatures, and returning reflux condensate admixed with fresh oil from the first-named refluxing operation to the pressure still.

In testimony whereof I affix my signature.

JOHN E. BELL.